US012673568B2

(12) United States Patent
Pfeilschifter et al.

(10) Patent No.: US 12,673,568 B2
(45) Date of Patent: Jul. 7, 2026

(54) CHARGING CIRCUIT HAVING A DIRECT-CURRENT TERMINAL AND AN ALTERNATING-CURRENT TERMINAL, AND VEHICLE ELECTRICAL SYSTEM HAVING A CHARGING CIRCUIT

(71) Applicant: Vitesco Technologies GmbH, Regensburg (DE)

(72) Inventors: Franz Pfeilschifter, Munich (DE); Martin Götzenberger, Munich (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 672 days.

(21) Appl. No.: 18/032,628

(22) PCT Filed: Oct. 14, 2021

(86) PCT No.: PCT/EP2021/078435
§ 371 (c)(1),
(2) Date: Apr. 19, 2023

(87) PCT Pub. No.: WO2022/084141
PCT Pub. Date: Apr. 28, 2022

(65) Prior Publication Data
US 2023/0382249 A1 Nov. 30, 2023

(30) Foreign Application Priority Data

Oct. 20, 2020 (DE) ..................... 10 2020 213 227.5

(51) Int. Cl.
B60L 53/22 (2019.01)
H02J 7/04 (2006.01)
H02J 7/90 (2026.01)

(52) U.S. Cl.
CPC ................ B60L 53/22 (2019.02); H02J 7/04 (2013.01); H02J 7/90 (2026.01); *B60L 2210/10* (2013.01);
(Continued)

(58) Field of Classification Search
CPC .. B60L 53/22; B60L 2210/10; B60L 2210/30; H02J 7/90; H02J 7/04; H02J 2207/20; H02J 2207/40
See application file for complete search history.

(56) References Cited

U.S. PATENT DOCUMENTS 9,000,717 B2    4/2015  Januschevski et al.
2015/0001958 A1    1/2015  Abe et al.
(Continued)

FOREIGN PATENT DOCUMENTS

CN        108068650 A      5/2018
DE    10 2016 122 008 A1    5/2018
(Continued)

OTHER PUBLICATIONS

International Search Report and Written Opinion for International Application No. PCT/EP2021/078435, dated Feb. 24, 2022, 8 pages.
(Continued)

*Primary Examiner* — Carlos Amaya
(74) *Attorney, Agent, or Firm* — Buchanan Ingersoll & Rooney PC

(57) ABSTRACT

A charging circuit is equipped with a storage battery terminal, a direct-current terminal and an alternating-current terminal, which is connected to an alternating-current side of a rectifier of the charging circuit. The direct-current side of the rectifier is connected via a changeover switch to a first side of a DC-to-DC converter, wherein the changeover switch connects the first side of the DC-to-DC converter
(Continued)

either to the direct-current terminal or to a first potential of the direct-current side of the rectifier. A second potential of the direct-current side of the rectifier is connected to the direct-current terminal via a diode. The reverse direction of the diode points toward the direct-current terminal. A second side of the DC-to-DC converter is connected to the storage battery terminal, to which the direct-current terminal is connected via an isolating switch. A vehicle electrical system having the charging circuit is also described.

10 Claims, 1 Drawing Sheet

(52) U.S. Cl.
CPC ....... *B60L 2210/30* (2013.01); *H02J 2207/20* (2020.01); *H02J 2207/40* (2020.01)

(56) References Cited

U.S. PATENT DOCUMENTS

| | | | |
|---|---|---|---|
| 2017/0179745 A1 | 6/2017 | Tritschler et al. | |
| 2018/0138730 A1 | 5/2018 | Fuchs et al. | |
| 2019/0275905 A1* | 9/2019 | Ruppert ............ | H02M 3/33561 |
| 2020/0180453 A1 | 6/2020 | Pfeilschifter et al. | |
| 2021/0380002 A1 | 12/2021 | Pfeilschifter et al. | |

FOREIGN PATENT DOCUMENTS

| | | |
|---|---|---|
| DE | 10 2017 213 682 A1 | 2/2019 |
| DE | 102019202345 A1 | 8/2020 |
| EP | 2527186 A2 | 11/2012 |
| JP | 2013-034352 A | 2/2013 |
| JP | 2013-219857 A | 10/2013 |
| KR | 20-0284136 Y1 | 7/2002 |
| KR | 10-2010-0138210 A | 12/2010 |
| KR | 10-1330349 B1 | 11/2013 |
| KR | 10-2020-0035124 A | 4/2020 |
| WO | 2021078518 A | 4/2021 |

OTHER PUBLICATIONS

International Search Report and Written Opinion for International Application No. PCT/EP2021/078435, dated Feb. 24, 2022 (German), 14 pages.
German Examination Report for German Application No. 10 2020 213 227.5, dated Jun. 17, 2021 with translation, 8 pages.
Notice of Allowance issued Dec. 24, 2024, by the Korean Intellectual Property Office in corresponding Korean Patent Application No. 10-2023-7016648 and an English translation of the Notice of Allowance. (4 pages).
Office Action (The First Office Action) issued Dec. 20, 2025, by the State Intellectual Property Office of People's Republic of China in corresponding Chinese Patent Application No. 202180071511.0 and an English translation of the Office Action. (13 pages).

* cited by examiner

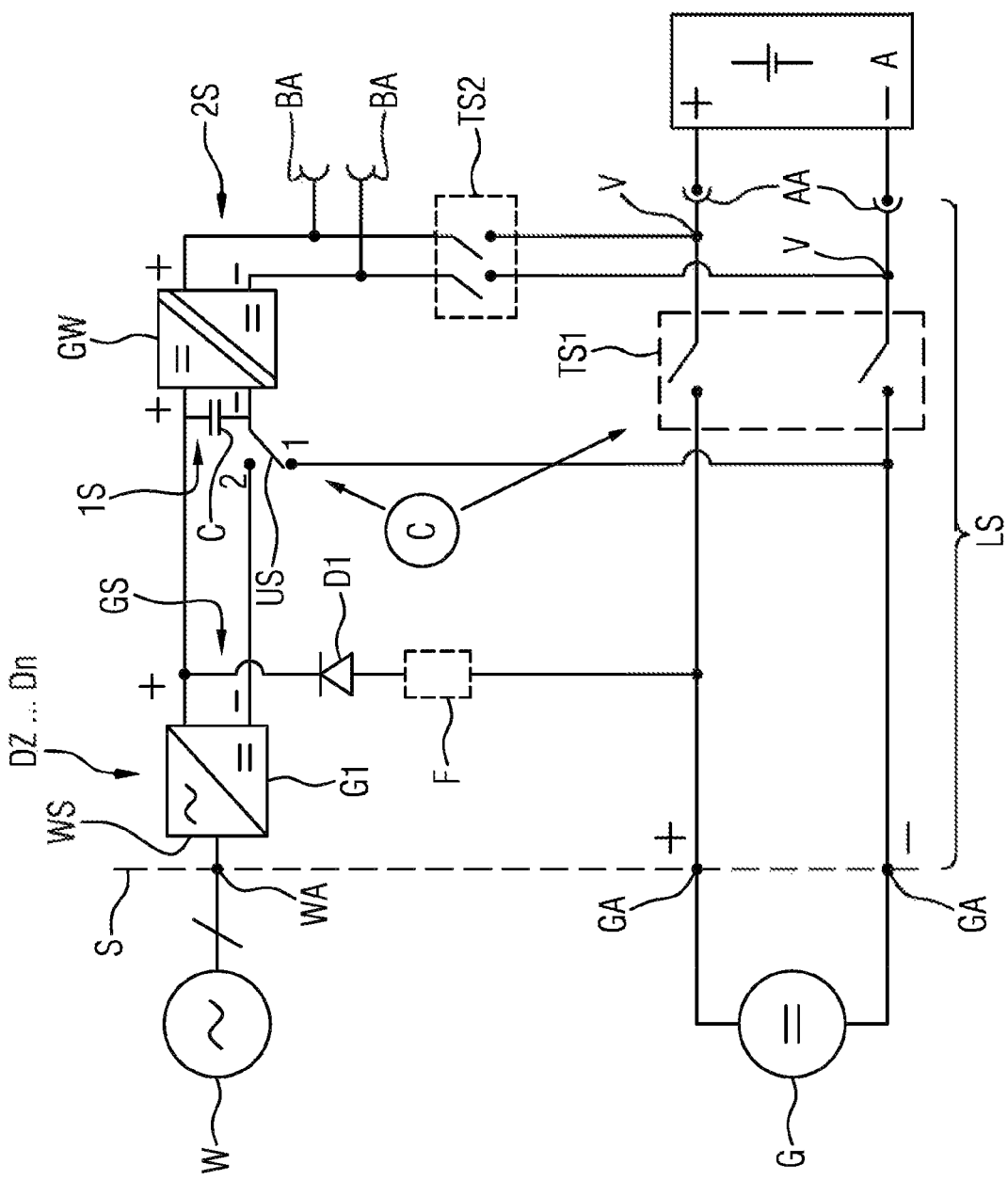

CHARGING CIRCUIT HAVING A DIRECT-CURRENT TERMINAL AND AN ALTERNATING-CURRENT TERMINAL, AND VEHICLE ELECTRICAL SYSTEM HAVING A CHARGING CIRCUIT

CROSS REFERENCE TO RELATED APPLICATIONS

This application is the U.S. National Phase application of PCT International Application No. PCT/EP2021/078435, filed Oct. 14, 2021, which claims priority to German Patent Application No. 10 2020 213 227.5, filed Oct. 20, 2020, the contents of such applications being incorporated by reference herein.

FIELD OF THE INVENTION

Charging circuit having a direct-current terminal and an alternating-current terminal, and vehicle electrical system having a charging circuit

BACKGROUND OF THE INVENTION

Vehicles with an electric traction drive have a storage battery that holds energy for electric driving. Furthermore, electrically operated vehicles are equipped with charging terminals which can be used to transmit electrical energy from a charging station to the storage battery of the vehicle. In order to be as compatible as possible, electric vehicles can be equipped with a direct-current charging terminal and an alternating-current charging terminal. A corresponding charging circuit must therefore not only provide components for directing or adapting the charging current, but also enable the most cost-effective possible use of further components of the vehicle that are to be electrically supplied. It must be taken into account here that the powers to be transmitted during electric driving and charging are high and the components used in the vehicle electrical system or the relevant charging circuit therefore represent a significant cost factor. Furthermore, it should be ensured that no dangerous contact voltages occur at the charging terminals, especially at charging terminals that are not used.

SUMMARY OF THE INVENTION

An aspect of the invention provides a possibility with which safe charging by means of alternating current or direct current can be implemented in a cost-effective manner.

It is proposed to provide a charging circuit having a storage battery terminal and having a direct-current terminal and an alternating-current terminal, the alternating-current terminal being connected to a rectifier. The direct-current terminal is connected to the storage battery terminal for the purpose of transmitting charging energy, while the rectifier is connected to the storage battery terminal via a DC-to-DC converter. A voltage level can be adapted to the suitable charging voltage by means of the DC-to-DC converter. Either the rectifier or the DC voltage terminal can be connected to the DC-to-DC converter via a changeover switch (depending on the type of charging), with the result that the DC-to-DC converter can be used for voltage adaptation for both types of charging. One embodiment provides for an isolating switch in a direct connection between the direct-current terminal and the storage battery terminal to be able to disconnect in this case.

In order to cost-effectively prevent the voltage from the rectifier from being applied to the direct-current terminal during alternating-current charging, a diode is provided in the connection between the direct-current charging terminal and the DC-to-DC converter, which diode blocks when the output of the rectifier generates a voltage for the DC-to-DC converter. As a result, the changeover switch (for changing over between alternating-current charging and direct-current charging) can also be provided with a single pole. Thus the changeover switch affects only one direct-current potential, while the diode acts in the other direct-current potential. This ensures that none of the named potentials of the direct-current side of the rectifier can be present at the direct-current charging terminal, isolation by the diode being provided for one potential and isolation by the changeover switch being provided for the other potential. A preferably all-pole isolating switch between the direct-current terminal and the storage battery terminal allows the direct-current terminal to be separated from the storage battery and the DC-to-DC converter. The direct-current side of the rectifier is connected to the storage battery terminal via the changeover switch and the DC-to-DC converter (in that order). The isolating switch is provided between the direct-current terminal and the storage battery terminal and allows (preferably all-pole) isolation of the direct-current terminal both from the storage battery terminal and from the DC-to-DC converter, i.e. from that side of the DC-to-DC converter which is connected to the storage battery terminal.

A charging circuit, in particular a vehicle-mounted charging circuit, having a direct-current terminal and an alternating-current terminal is therefore proposed. These terminals are set up for wired charging. The alternating-current terminal is connected to an alternating-current side of a rectifier of the charging circuit. The rectifier also has a direct-current side, wherein the rectifier is configured to convert an electrical current applied to an alternating-current side into a direct current on the direct-current side. The direct-current side is connected to a DC-to-DC converter via a changeover switch. The changeover switch connects a first side of the DC-to-DC converter (in particular a first potential thereof) either to the direct-current terminal (or a first potential thereof) or to a first potential of the direct-current side of the rectifier. It can thereby be selected whether the rectifier is connected to the DC-to-DC converter (and is thus connected to a storage battery terminal via the DC-to-DC converter) or whether the DC-to-DC converter is to be connected to the direct-current terminal. The changeover switch is set according to the charging mode (direct current/alternating current). A second potential of the direct-current side of the rectifier is connected to the direct-current terminal via a diode. The reverse direction of the diode points toward the direct-current terminal. As a result, according to this reverse direction, a transmission of a dangerous potential from the direct-current side of the rectifier (that is to say during alternating-current charging) to the direct-current terminal is suppressed. There is therefore no potential of the direct-current side of the rectifier at the direct-current terminal, since both the diode for one potential and the changeover switch for the other potential provide isolation. An isolating switch connects the storage battery terminal to the changeover switch on the one hand and to the direct-current terminal on the other hand. In other words, a second side of the DC-to-DC converter is connected to the storage battery terminal, the direct-current terminal being connected to the storage battery terminal via the isolating switch.

The changeover switch can thus have a single-pole design and is therefore less expensive than a two-pole changeover switch. The diode is a low-cost component compared to a two-pole changeover switch, even in high-power applications, and at the same time makes it possible for the relevant potential of the direct-current side of the rectifier to be effectively separated from the direct-current terminal.

The direct-current terminal can also be referred to as a direct-current charging terminal. The alternating-current terminal can also be referred to as an alternating-current charging terminal. Both terminals are preferably plug contacts, in particular plug contacts that can be connected to a charging cable on an outside of the vehicle. The charging circuit makes it possible for the direct-current terminal to be connected directly to a storage battery of the vehicle in order to thus implement quick charging. Furthermore, the DC-to-DC converter and the application via the changeover switch make it possible, for the purpose of voltage adaptation, for example at the beginning of a charging phase, to supply power from the direct-current terminal to the storage battery via the DC-to-DC converter for voltage adaptation. In addition to cost-effective separation of the direct-current terminal during alternating-current charging, the circuit also enables quick charging, with the DC-to-DC converter being able to be used both during DC voltage charging, if voltage adaptation is required, and during alternating-current charging.

A second side of the DC-to-DC converter is connected to a storage battery terminal of the charging circuit. The direct-current terminal is preferably also connected to this storage battery terminal (via an isolating switch, but without voltage conversion). The second side of the DC-to-DC converter can also be referred to as an output, while the first side can represent an input. These designations relate in particular to a charging process.

When the isolating switch is open (i.e. interrupted connection between the direct-current terminal and the storage battery terminal), the direct-current terminal is connected to the storage battery terminal via the diode and the changeover switch (regarding one of two potentials of the direct-current terminal) via the DC-to-DC converter. The changeover switch and diodes of the rectifier prevent voltage from the direct-current terminal from being transmitted to the alternating-current terminal. For direct direct-current charging, the isolating switch can be closed. During alternating-current charging, the changeover switch and the diode (each for one of two potentials of the direct-current side of the rectifier) prevent a dangerous potential from occurring at the direct-current terminal. The isolating switch here prevents DC voltage from being transmitted from the storage battery terminal to the (unused) direct-current terminal during alternating-current charging. The isolating switch is in the form of an all-pole isolating switch. The changeover switch has a single-pole design.

The DC-to-DC converter (in particular its second side) can be connected directly to the storage battery terminal. Alternatively, a second, preferably all-pole, isolating switch is provided, via which the DC-to-DC converter (in particular its second side) is connected to the storage battery terminal.

The first potential of the direct-current side of the rectifier is preferably a negative potential, for example a negative high-voltage potential (approximately the minus potential). This can either be connected via the changeover switch to the first side of the DC-to-DC converter, in particular a negative potential of this side, or can be connected via the changeover switch to the direct-current terminal, in particular a negative potential of the direct-current terminal. The first potential is therefore a negative potential which is connected to a negative potential on the first side of the DC-to-DC converter via the changeover switch. In this case, the second potential of the direct-current side of the rectifier is preferably a positive potential. This is connected to a positive potential of the direct-current terminal via the diode. In this case, the cathode of the diode is connected to the positive potential, that is to say the second potential, while the anode of the diode is connected to the direct-current terminal, in particular to its positive potential. In this case, the direct-current terminal comprises two contacts, one contact for a positive potential and one contact for a negative potential.

Designs are also conceivable in which the diode connects the negative potential of the direct-current side of the rectifier to the negative potential of the direct-current terminal, while the changeover switch is connected to a positive potential of the first side of the DC-to-DC converter and connects either a positive potential of the direct-current side of the rectifier or a positive potential of the direct-current side of the direct-current terminal to this. The diode is then correspondingly provided in the other potential and has a reverse direction which prevents current from flowing from the direct-current side to the direct-current terminal.

In general, the reverse direction of the diode is such that the diode prevents a current from flowing from the rectifier to the direct-current terminal when there is no voltage at the latter and conducts a current from the direct-current terminal to the DC-to-DC converter when a charging voltage is present at the direct-current terminal. The diodes of the rectifier have a blocking effect which prevents a current from flowing from one potential of the direct-current side of the rectifier to the other potential of the direct-current side when a voltage is present on the direct-current side of the rectifier, such as a charging voltage of the direct-current terminal. In other words, the rectifying elements of the rectifier prevent a current from flowing from a potential of the direct-current side to the alternating-current side when voltage is applied to the direct-current side and when voltage is not present on the alternating-current side of the rectifier.

The rectifier preferably does not provide electrical isolation. The rectifier can also be a rectifier that provides electrical isolation, but the use of a rectifier that provides electrical connection, i.e. a rectifier that does not provide electrical isolation, is more cost-effective. The DC-to-DC converter may be in the form of a DC-to-DC converter that provides electrical isolation and may thus have a transformer which is used to transmit the power. However, the DC-to-DC converter can also be a DC-to-DC converter that provides electrical connection. The use of a DC-to-DC converter that provides electrical connection is more cost-effective, but this does not allow any potential isolation between the two sides of the converter.

The power circuit preferably comprises an intermediate circuit capacitor. This is connected in parallel to the first side of the DC-to-DC converter. The intermediate circuit capacitor is provided between the changeover switch and the DC-to-DC converter. The intermediate circuit capacitor is thus directly connected to the first side of the DC-to-DC converter, irrespective of the switch position of the changeover switch. The intermediate circuit capacitor is thus located on that side of the DC-to-DC converter which faces the changeover switch or the rectifier. The intermediate circuit capacitor is provided in particular at that point on the DC-to-DC converter which faces away from the storage battery terminal.

The direct-current side of the rectifier may be connected to the direct-current terminal via the diode as well as via a fuse. The direct-current side of the rectifier is thus connected to the direct-current terminal via a series circuit, the series circuit resulting from the series connection of the diode and fuse. The fuse is preferably connected to the rectifier or to its direct-current side via the diode. This protects the circuit in the event of a short-circuit fault in the diode.

The charging circuit preferably comprises a controller. This is connected to the changeover switch in a controlling manner. The controller is configured to set the changeover switch to connect the first side of the DC-to-DC converter to the DC voltage side of the rectifier in an alternating-current charging state. The controller is also configured to connect the first side of the DC-to-DC converter to the direct-current terminal in a direct-current charging state. The alternating-current charging state is present when there is a single-phase or multi-phase voltage on the alternating-current side of the rectifier (while there is no voltage at the DC voltage terminal), and the direct-current charging state is present when there is a DC voltage, i.e. a charging DC voltage, at the DC voltage terminal (and no charging voltage is present at the AC voltage terminal).

The controller is preferably connected to the isolating switch in a controlling manner. The controller is preferably configured to provide the isolating switch in the open state when the alternating-current charging state is present and to provide the isolating switch in the closed state when the direct-current charging state is present.

The alternating-current terminal and the direct-current terminal are preferably designed according to a standard for the conductive charging of plug-in vehicles. This standard can be, for example, IEC 61851, IEC 60309/CEE, SAEJ 1772, IEC 62196-2 or EN62196 (Type II), each of which are incorporated herein by reference. The alternating-current terminal and the direct-current terminal are preferably provided by plug-in elements that are accessible from the outside of the vehicle so as to plug in a charging station plug. The alternating-current terminal and the direct-current terminal may also be provided by a common plug-in apparatus that combines the contacts for the alternating-current terminal and the direct-current terminal, in the sense of a combo terminal (CCS) or the like.

The charging circuit can be provided with a storage battery terminal which is likewise connected to the direct-current terminal and to the second side of the DC-to-DC converter. There are thus (two) connection points which connect the second side of the DC-to-DC converter to the storage battery terminal. The connection points are provided on one side of the isolating switch, while the opposite side of the isolating switch is connected to the first potential of the first side of the DC-to-DC converter via the changeover switch. This opposite side of the isolating switch is also connected to the second potential of the first side of the DC-to-DC converter via the diode. The storage battery terminal is connected to the connection points, thus resulting in a central interface for connecting a storage battery.

The charging circuit can have a storage battery isolating switch, which is connected downstream of this storage battery terminal, in order to thus be able to disconnect a storage battery (of a vehicle electrical system) that is connected to the charging circuit via the storage battery isolating switch. The storage battery terminal is designed for connection to a storage battery and has contacts which allow a storage battery to be connected. The storage battery terminal is in the form of a high-voltage storage battery interface. The prefix "high-voltage" means that the component in question is designed for a voltage of more than 60 V or at least 100 V, 200 V, 400 V or 800 V.

The storage battery interface can be connected to the first side of the DC-to-DC converter via the changeover switch and can be connected to the DC voltage side of the rectifier via the diode. In this case, the storage battery interface is connected to the diode and the changeover switch via the isolating switch. One potential terminal of the all-pole (two-pole) isolating switch is connected to the diode and another potential terminal of the all-pole (two-pole) isolating switch is connected to the changeover switch.

The charging circuit can also have a further isolating switch which is used to connect the second side of the DC-to-DC converter to the storage battery terminal or the direct-current terminal (i.e. to the connection points). This further isolating switch is preferably in the form of an all-pole (two-pole) switch.

The charging circuit can also have a vehicle electrical system terminal which is located on the second side of the DC-to-DC converter, in particular on that side of the further isolating switch which is (directly) connected to the second side of the DC-to-DC converter. When charging, for example, a vehicle electrical system branch connected to the charging circuit can be connected, via this vehicle electrical system terminal, to other electrical components which can be supplied both during alternating-current charging and during direct-current charging. In the case of alternating-current charging, these are supplied via the DC-to-DC converter. In the case of DC voltage charging, these can be supplied via the further isolating switch, or can also be supplied via the DC-to-DC converter when the isolating switch is open.

The vehicle electrical system described below comprises this vehicle electrical system branch connected to the charging circuit and having the corresponding components, such as components that are supplied with power during charging, such as an air conditioning compressor, a 12-volt vehicle electrical system converter, an electrically heatable catalytic converter, and the like. Furthermore, an electric traction drive can be provided in the vehicle electrical system branch. If this is supplied with energy via the storage battery terminal, the DC-to-DC converter isolates the vehicle electrical system terminal from the first side of the DC-to-DC converter. In a traction mode, the changeover switch preferably connects the DC-to-DC converter to the rectifier and isolates the DC-to-DC converter from the first potential of the direct-current terminal.

Furthermore, a vehicle electrical system is described, in particular a vehicle electrical system which has a charging circuit as described herein. The vehicle electrical system also comprises a storage battery. This is connected to the storage battery terminal and can be connected thereto directly or via a (preferably all-pole) storage battery isolating switch of the charging circuit. The storage battery can thus be connected to the direct-current terminal via the isolating switch and to the second side of the DC-to-DC converter, either directly or via the further isolating switch.

The vehicle electrical system comprises a charging circuit having an alternating-current terminal, which is connected to a DC-to-DC converter via a rectifier and a changeover switch provided at a first potential. The second potential between the rectifier and the DC-to-DC converter is connected to a second potential of a DC voltage terminal via a diode. The first potential of the DC voltage terminal is connected to the first potential between the rectifier and the DC-to-DC converter via the diode. An isolating switch connects the DC voltage terminal (and thus the diode and the changeover switch) to the storage battery terminal, to which a storage battery (part of the vehicle electrical system, not the charging circuit) is connected. The changeover switch connects a potential of a first side of the DC-to-DC converter either to a first potential of the DC voltage side of the rectifier or to the first potential of the DC voltage terminal. The second side of the DC-to-DC converter is connected to the storage battery terminal directly or preferably via a further isolating switch. The terminals, the rectifier, the inverter, the switches and the diode are part of the charging circuit. A storage battery of the vehicle electrical system is connected to the storage battery terminal. A vehicle electrical system terminal of the charging circuit is connected directly to the second side of the DC-to-DC converter, with a vehicle electrical system branch of the vehicle electrical system, which is not part of the charging circuit, being connected to the vehicle electrical system terminal. A controller switches at least the changeover switch as described above.

The vehicle electrical system is equipped with a charging circuit as described here. The vehicle electrical system has a storage battery that is connected to the storage battery terminal of the charging circuit. The vehicle electrical system has at least one component that is connected to a vehicle electrical system terminal of the charging circuit. The vehicle electrical system terminal is connected to the second side of the DC-to-DC converter (preferably directly) and is connected to the storage battery terminal of the charging circuit via the (optional) further isolating switch of the charging circuit. The vehicle electrical system is preferably a high-voltage vehicle electrical system. The vehicle electrical system is preferably a vehicle electrical system, for example of a vehicle with an electric traction drive.

BRIEF DESCRIPTION OF THE DRAWINGS

The FIGURE shows a circuit diagram for a more detailed explanation of the charging circuit described here and the vehicle electrical system described here.

DETAILED DESCRIPTION OF THE PREFERRED EMBODIMENTS

The FIGURE shows a charging circuit LS, to which a storage battery A, on the one hand, and a direct-current source G and an alternating-current source W, on the other hand, are connected. The charging circuit LS comprises an interface S which has a direct-current terminal GA and an alternating-current terminal WA. Both terminals are charging terminals. It is shown that an alternating-current source W or a direct-current source G can be connected to the corresponding terminals WA, GA, so that there is compatibility for both types of charging.

The charging circuit LS has a rectifier G1 which has an alternating-current side WS which is (directly) connected to the alternating-current terminal WA. A DC-to-DC converter GW of the charging circuit LS is connected to the corresponding direct-current side GS of the rectifier G1 via a (single-pole) changeover switch US. The first potential, i.e. the minus potential –, of the direct-current side is connected to the first potential—of a first side of the DC-to-DC converter GW via the changeover switch US. The changeover switch US is configured, in a first switching state 1, to connect the first side 1S of the DC-to-DC converter GW, in particular its first potential –, to the direct-current terminal GA, in particular to its first potential –. This switching position of the changeover switch US is marked with the reference sign 1. In this switching position, the changeover switch US isolates the DC-to-DC converter GW from the rectifier GS (based on the first potential –).

In the other switching position 2 of the changeover switch US, the first potential—of the DC voltage side GS of the rectifier G1 is connected to the first potential—of the first side of the DC-to-DC converter GW. In this switching position, the changeover switch isolates the DC-to-DC converter GW from the direct-current terminal GA (based on the first potential—of GW and GA).

The DC-to-DC converter GW has a second side 2S which is (directly) connected to a vehicle electrical system terminal BA. Furthermore, the second side 2S of the DC-to-DC converter GW is connected to the storage battery terminal (via a further isolating switch TS2). The second side 2S of the DC-to-DC converter is connected (via the further isolating switch TS2) to a connection point V, at which the second side 2S of the DC-to-DC converter is connected via the further isolating switch TS2 to the isolating switch TS1 which leads to the direct-current terminal GA. In addition, this connection point V is connected to the storage battery terminal AA of the charging circuit LS. A storage battery A of the vehicle electrical system shown is connected to the storage battery terminal AA of the charging circuit LS. The second side 2S of the DC-to-DC converter (GW) is thus connected to the storage battery terminal AA (via the optional further isolating switch TS2) which is connected to the DC voltage terminal GA via the isolating switch TS1. The storage battery terminal is connected to the rectifier G1 (or its DC voltage side GS) via the isolating switch TS1 and via the diode D1 and the changeover switch US (provided in different potential rails+, –). The direct-current terminal GA is connected directly to the diode D1 and to the changeover switch US which lead directly to the DC voltage side GS or to the first side 1S of the DC-to-DC converter GW. A storage battery isolating switch (not shown) can be provided between the connection point V and the storage battery terminal AA, or the storage battery terminal AA is connected directly to the connection point V.

The further isolating switch TS2 is optional and can be connected between the second side 2S of the DC-to-DC converter GW and the storage battery terminal (or the isolating switch TS1). In particular, the further isolating switch TS2 is connected between the vehicle electrical system terminal BA and the storage battery terminal AA. The isolating switches have a two-pole design and isolate both potentials in a switchable manner.

The vehicle electrical system terminal BA is part of the charging circuit, with further components (in particular high-voltage components such as an air conditioning compressor, a 12 V converter, a catalytic converter heating element and in particular an electric drive) of the vehicle electrical system being able to be connected to the vehicle electrical system terminal BA. However, these components are not part of the charging circuit LS.

While a first potential – of the DC voltage side GS of the rectifier G1 is connected to the first side 1S of the DC-to-DC converter GW via the changeover switch US (single-pole design), there is a direct connection between the direct-current side GS and the first side 1S for the second, positive potential +. The second potential + is connected to the second potential + of the direct-current terminal GA via a diode D1. The diode D1 thus also connects the second potential + of the direct-current side (and thus also the second potential plus of the first side 1S) to the connection point V or to the storage battery terminal AA via the isolating switch TS1. An optional fuse F can be provided between the diode D1 and the second potential + of the direct-current terminal GA.

A controller C is connected to the changeover switch US (as shown by the arrow) in a controlling manner in order to set either the switching position 1 or the switching position 2 of the changeover switch US. The changeover switch is preferably in switching position 2 during alternating-current charging and in switching position 1 during direct-current charging.

The rectifier G1 also has diodes D2 to DN which are not shown in detail for reasons of clarity. The rectifier G1 can be provided, for example, as a power factor correction filter or as a BnC bridge, where n is twice the number of phases of the alternating-current terminal WA. During alternating-current charging, the changeover switch US is provided in switching position 2, with the result that the first potential— of the direct-current side GS is decoupled from the first potential—of the direct-current terminal GA due to the changeover switch US.

The controller C can also be connected in a controlling manner to the (all-pole) isolating switch TS1 which is located between the connection point V or the storage battery terminal AA on the one hand and the direct-current terminal GA on the other hand. During alternating-current charging, the controller C then controls the changeover switch US to assume position 2, while the controller provides the isolating switch TS1 in an open switching state. The first potential—of the direct-current terminal GA is therefore isolated from the first potential—of the direct-current side GS and the first side 1S via the changeover switch US, and also isolated from the first potential—of the second side 2S of the DC-to-DC converter via the isolating switch TS1. For the second potential +, it can be determined during alternating-current charging that the second potential plus of the direct-current side GS (and thus also of the first side 1S of the DC-to-DC converter GW) is isolated from the second potential + of the direct-current terminal GA via the diode D1. Furthermore, the second potential + of the second side 2S of the DC-to-DC converter GW is also isolated from the direct-current terminal GA via the isolating switch TS1. Equally, however, the connection between 2S and AA allows power to flow from the DC-to-DC converter GW to the storage battery A during alternating-current charging. The optional isolating switch TS2 is open during alternating-current charging (and closed during direct-current charging), for which purpose the controller C can be connected to the isolating switch TS2 in a controlling manner.

During direct-current charging, power flows from the direct-current terminal GA via the isolating switch TS1 (controlled to be closed during direct direct-current charging) to the storage battery terminal AA. Here, the diodes D2 . . . Dn of the rectifier G1 block any current flow from the direct-current side GS of the rectifier G1 to the alternating-current terminal WA. In addition, during direct direct-current charging, the switch TS2 can be controlled to be open. Furthermore, during voltage adaptation direct-current charging, the isolating switch TS1 can be open (and the optional switch TS2 closed) so as to transmit power via the converter GW to the storage battery terminal AA. Here, too, the diodes D2 . . . Dn result in a blocking effect (for the second potential), while the changeover switch US for the first potential—isolates the first side 1S of the converter GW from the direct-current side GS of the rectifier G1. This ensures, even with direct-current charging (direct charging and voltage adaptation direct-current charging via the converter GW), that the terminal that is not used in each case, in this case the terminal WA, is not connected to any of the potentials of the active charging terminal (in this example the charging terminal GA) in a current-carrying manner.

Since the changeover switch US has only a single-pole design, there is a cost advantage compared to a two-pole design of the changeover switch US, even if the diode D1 is necessary for the single-pole design of the changeover switch US, since it is less expensive than a multi-pole changeover switch US.

The invention claimed is:

1. A charging circuit having a storage battery terminal, a direct-current terminal and an alternating-current terminal, which is connected to an alternating-current side of a rectifier of the charging circuit, the direct-current side of which is connected via a changeover switch to a DC-to-DC converter, wherein the changeover switch connects a first side of the DC-to-DC converter either to the direct-current terminal or to a first potential of the direct-current side of the rectifier, and a second potential of the direct-current side of the rectifier is connected to the direct-current terminal via a diode, the reverse direction of which points toward the direct-current terminal, wherein a second side of the DC-to-DC converter is connected to the storage battery terminal, to which the direct-current terminal is connected via an isolating switch.

2. The power circuit as claimed in claim 1, wherein the first potential of the direct-current side of the rectifier is a negative potential which is connected to a negative potential of the first side of the DC-to-DC converter via the changeover switch, and the second potential of the direct-current side of the rectifier is a positive potential which is connected to a positive potential of the direct-current terminal via the diode.

3. The charging circuit as claimed in claim 1, wherein the isolating switch is in the form of an all-pole isolating switch and the changeover switch has a single-pole design.

4. The charging circuit as claimed in claim 1, wherein the second side of the DC-to-DC converter is connected to the storage battery terminal of the charging circuit directly or via a second, all-pole isolating switch.

5. The charging circuit as claimed in claim 1, wherein connection points which connect the second side of the DC-to-DC converter to the storage battery terminal are provided on one side of the isolating switch, while the opposite side of the isolating switch is connected to the first potential of the first side of the DC-to-DC converter via the changeover switch and to the second potential of the first side of the DC-to-DC converter via the diode.

6. The charging circuit as claimed in claim 1, wherein the rectifier does not provide electrical isolation and the DC-to-DC converter is a DC-to-DC converter that provides electrical isolation.

7. The power circuit as claimed in claim 1, which also has an intermediate circuit capacitor which is connected in parallel to the first side of the DC-to-DC converter between the changeover switch and the DC-to-DC converter.

8. The charging circuit as claimed in claim 1, which also has a controller which is configured to set the changeover switch to connect the first side of the DC-to-DC converter to the DC voltage side of the rectifier in an alternating-current charging state and to connect the first side of the DC-to-DC converter to the direct-current terminal in a direct-current charging state.

9. The charging circuit as claimed in claim 8, wherein the controller is connected to the isolating switch in a controlling manner and is configured to provide the isolating switch in the open state when the alternating-current charging state is present and to provide the isolating switch in the closed state when the direct-current charging state is present.

10. A vehicle electrical system having a charging circuit as claimed in claim 1, wherein the vehicle electrical system also has a storage battery which is connected to the storage battery terminal of the charging circuit, wherein the vehicle electrical system has at least one component which is connected to a vehicle electrical system terminal of the charging circuit, which is connected to the second side of the DC-to-DC converter and, via a further isolating switch of the charging circuit, to the storage battery terminal of the charging circuit.

\* \* \* \* \*